United States Patent [19]
Roger

[11] 3,793,082
[45] Feb. 19, 1974

[54] PROCESS FOR MAKING ELECTRICAL CONTACTS OF SOLAR BATTERIES AND SOLAR BATTERIES MADE ACCORDING TO THIS PROCESS

[75] Inventor: Jacques Roger, Paris, France
[73] Assignee: Societe Anonyme de Telecommunications, Paris, France
[22] Filed: May 7, 1971
[21] Appl. No.: 141,325

[30] Foreign Application Priority Data
Sept. 24, 1970 France .............................. 70.34679

[52] U.S. Cl. ...................... 136/89, 29/572, 29/589
[51] Int. Cl. ........................... B01j 17/00, H01l 15/02
[58] Field of Search...... 29/589; 312/234 M; 136/89

[56] References Cited
UNITED STATES PATENTS
3,436,615  4/1969  Finlayson.............................. 29/589
3,436,818  4/1969  Merrin et al........................... 29/589
3,400,003  8/1969  Hampikian...................... 317/234 M
3,567,508  3/1971  Cox et al........................ 317/234 M
3,651,562  3/1972  Hambleton..................... 317/234 M Primary Examiner—Roy Lake
Assistant Examiner—W. C. Tupman
Attorney, Agent, or Firm—Seidel, Gonda & Goldhammer

[57]  ABSTRACT

The invention relates to a process for making solar batteries by means of which a photo-sensitive semiconductor part is produced and this part provided with two contact areas onto which, according to the invention, contact pieces are fixed by intermetallic diffusion between the two parts to be joined.

6 Claims, 2 Drawing Figures

PROCESS FOR MAKING ELECTRICAL CONTACTS OF SOLAR BATTERIES AND SOLAR BATTERIES MADE ACCORDING TO THIS PROCESS

The present invention relates to a process for making solar batteries, as well as solar batteries made according to this process.

More particularly, the invention relates to a process for making a photo-sensitive semi-conductor part, and providing this part with two contact areas for collecting electrical energy supplied by the solar battery.

The development of space research has also resulted in the development of techniques related to solar batteries. Thus the power required for operating a satellite is supplied by a solar generator, consisting of an assembly of batteries or solar cells made, for example, of silicon. Such a solar generator can cover either the surface of the satellite itself or the special panels attached to the body of the satellite. In particular, when the power required on board is considerable, and this is increasingly the case, the attached panels that are used are very large, about fifty square meters in area, and these must not be unfolded until after the satellite has been launched.

So, to reduce the weight of these panels, silicon cells are fixed no longer to rigid panels, but onto an elastic support which can be rolled up or folded. The thermal inertia of such a device is reduced, producing thereby extremely steep temperatures gradients, when the panels pass from the illuminated state to the non-illuminated state, and inversely.

A number of various processes for making solar batteries contacts are already known. As these batteries are generally used on satellites and, because of this subjected over long periods, sometimes of the order of ten years, to a very large number of thermal cycles, it has been found that such assemblies stand up badly to such conditions. The breakdowns observed are due in part to the difference in the linear coefficient of expansion of the constituents, and in part, to the degradation of the tin normally used in the manufacture of such contacts. In addition, the welding of the contacts normally used subjects the solar battery to a thermal shock which is very localised in the neighborhood of the weld, which affects the functioning of the cell adversely.

The object of the present invention is to overcome these disadvantages and to devise a process enabling the contacts of solar batteries to be fixed in a simple manner, without reducing the power supplied by these batteries.

The present invention therefore relates to a process in which the contact pieces are fixed onto the contact areas by means of intermetallic diffusion between the two parts to be joined.

It is particularly advantageous, according to another characteristic feature of the invention, to effect the intermetallic diffusion during the last phase of the heat treatment specific to the battery contacts, this treatment involving the whole of the battery.

According to a variant, the contacts of the battery are produced by at least one metallic layer submitted to heat treatment in a controlled atmosphere.

In certain cases, for the parts that are in frequent use, the heat treatment is effected by subjecting the parts to be joined to pressure.

In addition, the invention relates to solar batteries made according to the process described above. It extends also to the whole of a solar generator constituted by the assembly of such batteries.

In general, the principle advantage of the present invention lies in the fact that it retains its efficiency in a better way which is very important for solar generators that are put into orbit.

The process will now be described with the aid of a method of making electrical contacts of a silicon solar battery, illustrated by an example represented in the accompanying drawing, in which.

First, the manufacture of a plate of a solar battery made according to known diffusion processes will be described.

Figure 1:
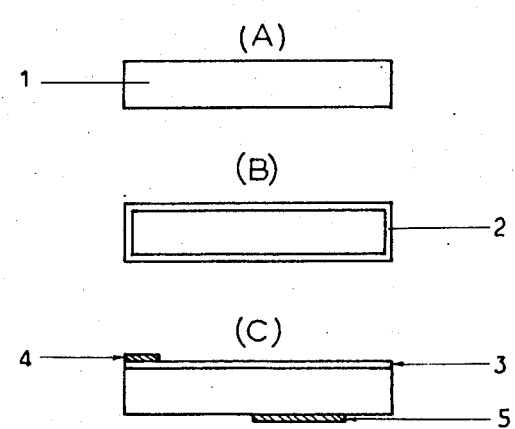
FIG. 1 shows the section of a solar battery in three stages A-B-C of manufacture.

Thus, in FIG. 1A, a plate 1 of silicon P is used and serves as a base for the manufacture of the solar battery. A layer N, indicated as 2 in FIG. 1B, over the entire surface of the plate is obtained by means of known diffusion processes.

In the areas where this layer N is not required, it is removed by any process such as is used in engraving, only the upper layer 3 (FIG. 1C) being retained.

The contact areas 4 and 5 are then prepared by the deposition of metals such as titanium or silver.

Figure 2:
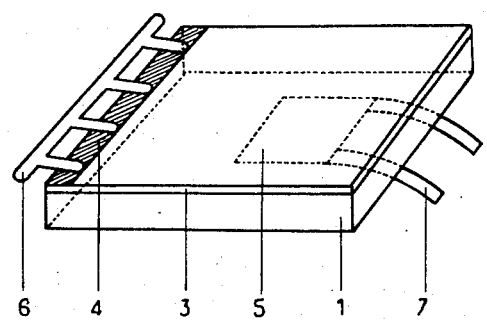
FIG. 2 is a perspective view of a completed solar battery, fitted with its contact pieces.

In the perspective view of the completed solar battery, such as illustrated in FIG. 2, there is a silicon plate 1 and the layer that has become N by diffusion and which has not been removed. This layer 3 constitutes a network of electrodes terminating in the area 4 provided for fitting the contact piece 6.

In this FIG. 2, the lower contact piece 7 is shown fixed to the lower contact 5 of the solar battery. It is advantageous to select the metals constituting, on one hand, the contact areas of the battery, and, on the other, the contact pieces, in a way such that their coefficient of expansion is close to that of silicon, in order to avoid to a large degree the sudden thermal constraints created by the extremely steep temperature gradients that occur when the batteries pass from the illuminated state to the non-illuminated state, or inversely.

The contact pieces 6 and 7 have a cut-out form, as illustrated as an example in FIG. 2. The contact pieces can also be in solid form, in which case, however, the surface is treated so that the adhesion between a contact piece and the contact area is obtained only at a certain number of points designed to be connection points.

The same result can be obtained with a contact piece that has been treated completely and a tool with which localised pressure is applied in order to obtain adhesion of the two metals by means of diffusion.

After the manufacture of the batteries has been completed, checked, and tested electrically, these parts, fitted with integrated contacts are assembled into parallel module series by joining the interconnections by means of electric welding.

The assembly can be made either directly or with the help of connection strips.

As before, the type of connection strip chosen will depend on the particular application for which the battery is intended to be used. For instance, the coefficient of expansion of this strip can be suited to that of the substrate, independently of the silicon and the nature of the contacts. In addition, the contacts of the solar battery consist of one or several thin layers of metal, superimposed and subjected to heat treatment in a controlled atmosphere. For this, an interconnection strip made of metal, between the batteries, is connected directly to the contact previously coated with layers of one or several metals in order, for example, to improve weldability and avoid corrosion.

To obtain the diffusion of the two external layers into one another and obtain an electrically resistant, permanent joint, it is necessary to select appropriately the type of the internal layer, the solar contact layer and that of the contact.

According to one variant, it is possible to insert an intermediate layer between the external layers of the battery contact and its connection link. The intermediate metal must be chosen so as to obtain a eutectic combination with the internal layers.

The heat treatment, proper to the battery contact, combined with the heat treatment by means of welding by diffusion, is an essential characteristic feature of the invention.

Many tests have been carried out in application of the present invention.

In these tests, in general, a so-called "Titanium-Silver" contact has been used. Treatment temperatures have ranged between 500°C and 700°C for periods of 30 to 5 mn. It has been found advantageous to use pressures of the order of 50 kg/cm2 to effect the thermal silver-titanium diffusion. Under the experimental conditions described above an excellent low-resistance contact was obtained. The dimensions of the batteries used in this test were 20 × 20 × 0.3 mm. The efficiency of these batteries was 10 to 12 percent.

This process enables solar batteries to be obtained fitted with their interconnection strips, and integrated during the last operation in the manufacture of a battery. In this way both the electrical efficiency and reliability of the battery are considerably improved.

It will be obvious that the invention is not limited to the examples of its applications herein above described and illustrated and that other variants of it can be envisaged within the scope of the invention.

I claim:

1. A process for making electrical contacts on a semiconductor solar battery, said process comprising the steps of:

providing a semiconductor solar battery, said solar battery being comprised of a first portion of N type semiconductive material and a second portion of P type semiconductive material forming a photosensitive junction portion;

depositing a metal comprised of silver on an electrical contact area on said first and second portions of said battery by evaporating said metal in a vacuum onto said contact areas; and fixing the metal contact pieces to the deposited metal on said contact areas by intermetallic diffusion using temperatures in the range of 500° centigrade to 700° centigrade and a pressure of approximately 50 kilograms per square centimeter.

2. A process in accordance with claim 1 wherein said depositing step comprises the step of depositing a metal comprised of a silver-titanium alloy.

3. A process in accordance with claim 1 wherein said intermetallic diffusing is carried out during the last phase of heat treatment in the manufacture of the battery.

4. A solar battery made in accordance with the process of claim 1.

5. A solar battery in accordance with claim 4 wherein said metal deposited on said contact area comprises a silver-titanium alloy.

6. A solar battery made in accordance with the process of claim 3.

* * * * *